(12) United States Patent
Inoue

(10) Patent No.: US 7,062,910 B2
(45) Date of Patent: Jun. 20, 2006

(54) ENGINE CONTROL SYSTEM

(75) Inventor: Kiyohisa Inoue, Yokohama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/037,182

(22) Filed: Jan. 19, 2005

(65) Prior Publication Data
US 2005/0155348 A1    Jul. 21, 2005

(30) Foreign Application Priority Data
Jan. 20, 2004 (JP) .............................. 2004-011318

(51) Int. Cl.
- F02B 33/44 (2006.01)
- F02D 23/00 (2006.01)
- F02M 25/07 (2006.01)
- F02B 37/24 (2006.01)
- F02D 43/00 (2006.01)

(52) U.S. Cl. ............... 60/605.2; 60/602; 60/605.1; 123/568.16; 123/568.21; 701/108

(58) Field of Classification Search ........... 60/605.2, 60/602, 605.1; 123/568.16, 568.21; 701/108
See application file for complete search history.

(56) References Cited

U.S. PATENT DOCUMENTS

| | | | |
|---|---|---|---|
| 6,128,902 A * | 10/2000 | Kolmanovsky et al. .... | 60/605.2 |
| 6,363,922 B1 * | 4/2002 | Romzek et al. ......... | 123/568.16 |
| 6,625,985 B1 * | 9/2003 | Shirakawa ............. | 60/602 |
| 6,725,660 B1 * | 4/2004 | Hidaka ................. | 60/602 |
| 6,802,302 B1 * | 10/2004 | Li et al. .............. | 123/568.16 |
| 6,850,833 B1 * | 2/2005 | Wang et al. ........... | 60/605.2 |
| 2005/0131620 A1 * | 6/2005 | Bowyer ................ | 701/108 |
| 2005/0178123 A1 * | 8/2005 | Uchiyama et al. ...... | 60/605.2 |

FOREIGN PATENT DOCUMENTS

| | | | |
|---|---|---|---|
| JP | 2000-170588 | | 6/2000 |
| JP | 2001182575 A | * | 7/2001 |
| JP | 2001193573 A | * | 7/2001 |

\* cited by examiner

Primary Examiner—Thai-Ba Trieu
(74) Attorney, Agent, or Firm—Nixon & Vanderhye P.C.

(57) ABSTRACT

In a case where an oscillation frequency per unit time of a first feedback amount of supercharging pressure (VNT) control exceeds a judgment value, or in a case where an oscillation frequency per unit time of a second feedback amount of exhaust gas recirculation (EGR) control exceeds a judgment value, it is determined that a target VNT opening degree or a target EGR opening degree is in a hunting state. In the case where the hunting of the target VNT opening degree or the target EGR opening degree is detected, a first or a second gain correction coefficient multiplied to the first or the second feedback amount is changed to a value to decrease an absolute value of the first or the second feedback amount.

8 Claims, 4 Drawing Sheets

ENGINE CONTROL SYSTEM

CROSS-REFERENCE TO RELATED APPLICATION

This application is based on Japanese Patent Application No. 2004-11318 filed on Jan. 20, 2004, the disclosure of which is incorporated herein by reference.

FIELD OF THE INVENTION

The present invention relates to an engine control system which can simultaneously perform supercharging pressure control by feedback control of an opening degree of a variable nozzle of a variable nozzle turbocharger and exhaust gas recirculation volume control by feedback control of an opening degree of an exhaust gas recirculation volume control valve of an exhaust gas recirculation device.

BACKGROUND OF THE INVENTION

As shown in JP-2000-170588 A, there is proposed an engine control system which includes a supercharging pressure control unit for performing a supercharging pressure control by controlling a variable blade (variable nozzle) of a variable nozzle turbocharger, and an EGR control unit for performing an exhaust gas recirculation volume control (EGR control) by controlling an exhaust gas recirculation volume control valve (EGR control valve) of an exhaust gas recirculation device. Incidentally, the supercharging pressure control is constructed so as to perform feedback control of the opening degree of the variable blade on the basis of a deviation between an actual supercharging pressure and a target supercharging pressure so that the actual supercharging pressure (actual intake pressure detected by an intake pressure sensor) substantially coincides with a target supercharging pressure (target intake pressure) set according to the operation state of an engine. The exhaust gas recirculation volume control is constructed so as to perform feedback control of the opening degree of the EGR control valve on the basis of a deviation between an actual fresh intake volume and a target fresh intake volume so that the actual fresh intake volume detected by an intake volume sensor substantially coincides with the target fresh intake volume set according to the operation state of the engine.

However, in the conventional engine control system, when the EGR control valve is opened, as shown in FIG. 1, pressure of an "A" area of an exhaust path from an exhaust port of the engine to the variable nozzle of the variable nozzle turbocharger and an exhaust gas recirculation passage at the exhaust path side of the EGR control valve is lowered. The flow velocity of the exhaust gas blown into a turbine wheel from the exhaust path of the engine is decreased, and the rotation of the turbine wheel is decreased.

When the rotation of the turbine wheel is decreases, the rotation of a compressor wheel coaxial with the turbine wheel is also decreased and the actual supercharging pressure is decreased. In order to secure the target intake pressure, the variable nozzle is closed according to the deviation between the actual supercharging pressure and the target supercharging pressure.

When the variable nozzle is closed, the pressure of the "A" area is raised, the exhaust gas recirculation volume (EGR volume) of the exhaust gas recirculation path is increased by the rise and the actual fresh intake volume is decreased. Therefore, in order to secure the target fresh intake volume, the EGR control valve is closed according to the deviation between the actual fresh intake volume and the target fresh intake volume.

As described above, when the EGR control and the supercharging pressure control perform the feedback control independently of each other, there occurs such a problem that the control is not stabilized, and according to circumstances, the control command value of the variable nozzle and the control command value of the EGR control valve hunt (oscillate at a specified frequency).

SUMMARY OF THE INVENTION

An object of the present invention is to provide an engine control system in which in a case where hunting of one of a first control command value of a variable nozzle of a variable nozzle turbocharger and a second control command value of a flow rate control valve of an exhaust gas recirculation device is detected, an absolute value of a feedback amount is lowered, so that the hunting of the one of the first control command value of the variable nozzle and the second control command value of the flow rate control valve can be prevented.

According to the invention, in a case where an index value indicating a specified hunting state of one of a first control command value obtained by using a first feedback amount updated according to a deviation between an actual intake pressure detected by an intake air pressure detection unit and a target intake pressure, and a second control command value obtained by using a second feedback amount updated according to a deviation between an actual intake volume detected by an intake air volume detection unit and a target intake volume exceeds a judgment value, one of the first feedback amount and the second feedback amount is multiplied by a correction coefficient to decrease an absolute value of the feedback amount, and one of the first control command value and the second control command value is obtained. Thus, the hunting of the first control command value of the variable nozzle of the variable nozzle turbocharger or the second control command value of the flow rate control valve of the exhaust gas recirculation device can be restricted.

BRIEF DESCRIPTION OF THE DRAWINGS

Other objects, features and advantages of the present invention will become more apparent from the following detailed description made with reference to the accompanying drawings, in which like parts are designated by like reference numbers an in which.

DETAILED DESCRIPTION OF THE EMBODIMENTS

According to the best mode for carrying out the invention, an object of preventing hunting of one of a first control command value of a variable nozzle of a variable nozzle turbocharger (VNT) and a second control command value of a flow rate control valve of an exhaust gas recirculation device is realized by reducing an absolute value of a feedback amount in a case where the hunting of one of the first control command value of the variable nozzle and the second control command value of the flow rate control valve is detected.

First Embodiment

Figure 1:
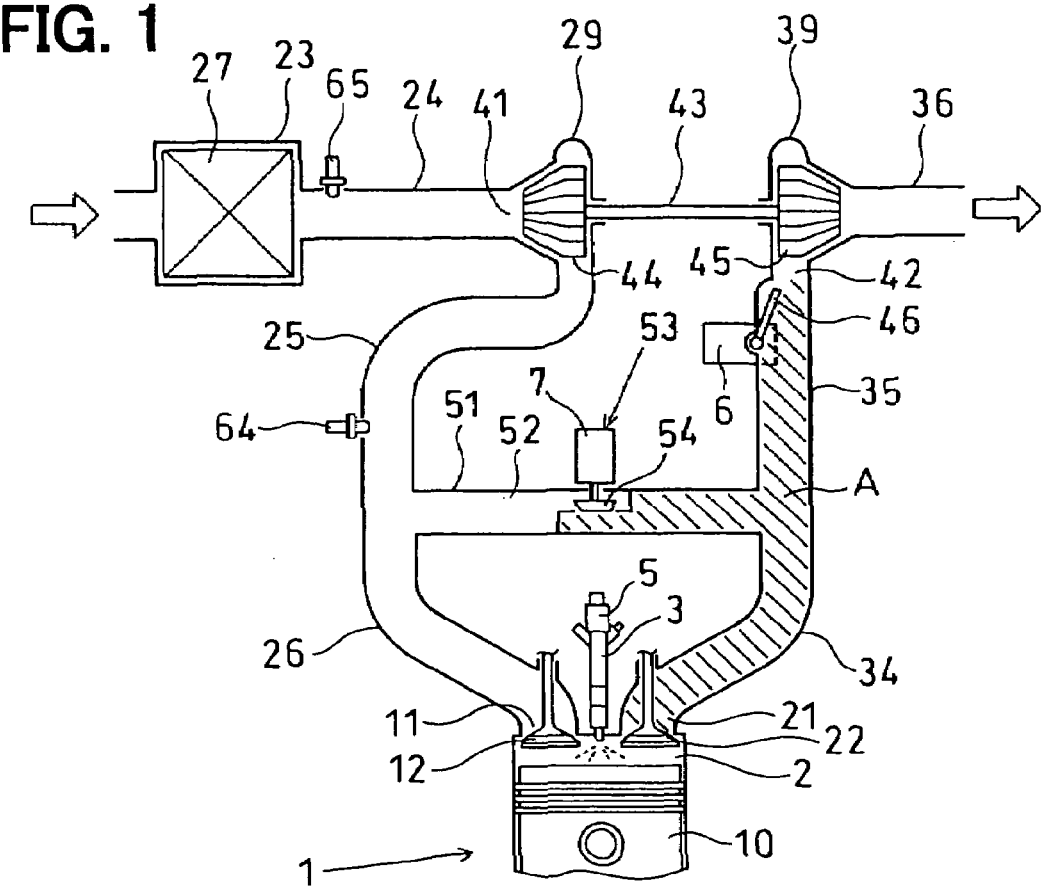
FIG. 1 is a schematic view showing a whole structure of an engine control system according to a first embodiment.
Figure 2:
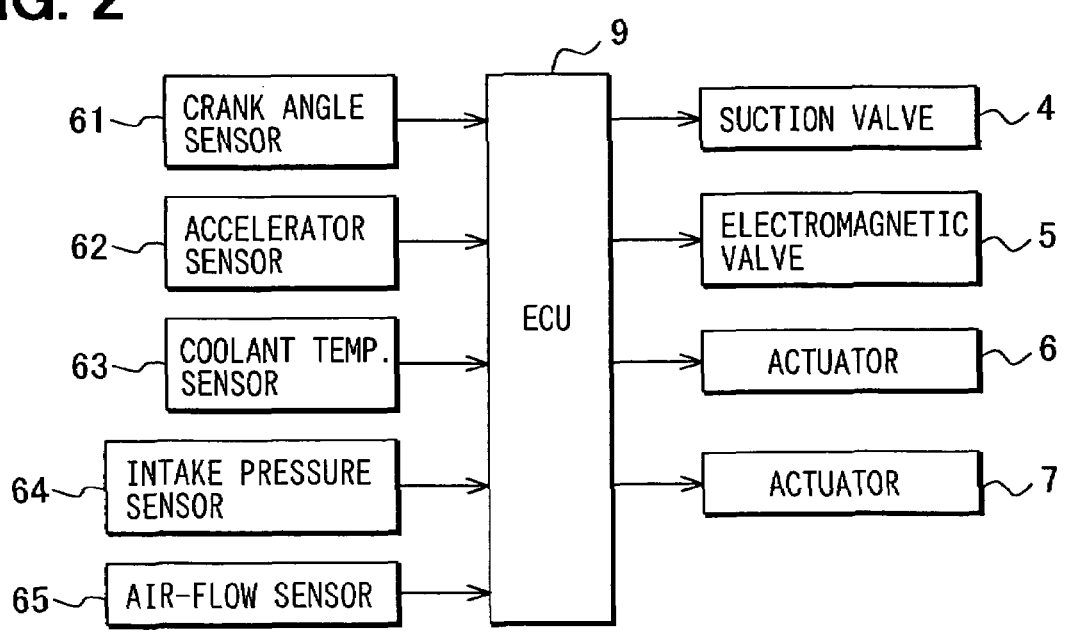
FIG. 2 is a block diagram showing a rough structure of a control system of the engine control system according to the first embodiment.

FIGS. 1 to 4 show a first embodiment of the invention, in which FIG. 1 is a view showing a whole structure of an engine control system, and FIG. 2 is a view showing a rough structure of a control system of the engine control system.

The engine control system of this embodiment includes an accumulator fuel injection device for injecting and supplying a high pressure fuel into a combustion chamber 2 of each cylinder of an internal combustion engine (hereinafter referred to as an engine) 1, such as a diesel engine, mounted in a vehicle such as, for example, an automobile. The engine control system includes a variable nozzle turbocharger for supercharging intake air of the engine 1, an exhaust gas recirculation device for recirculating a part of an exhaust gas of the engine 1 to an intake side, and an electronic control unit (hereinafter referred to as an ECU) 9 for electrically controlling respective actuators of the accumulator fuel injection device, the variable nozzle turbocharger, and the exhaust gas recirculation device.

A piston 10 coupled to a crankshaft through a connecting rod is slidably disposed in each cylinder of the engine 1. An intake valve 12 for opening and closing an intake port 11 of the engine 1 and an exhaust valve 22 for opening and closing an exhaust port 21 of the engine 1 are attached to a cylinder head of the engine 1. The intake port 11 of the engine 1 is constructed such that fresh intake air is supplied through an intake path of intake pipes 24 to 26 of the engine 1. The exhaust port 21 of the engine 1 is constructed such that the exhaust gas is exhausted to an exhaust path of exhaust pipes 34 to 36. Here, reference numeral 27 denotes a filter element (air filter) contained in an air cleaner case 23 disposed at the upstream side of the intake pipes 24 to 26.

The accumulator fuel injection device includes a common rail (not shown) for accumulating high pressure fuel corresponding to the injection pressure of fuel injected and supplied into the combustion chamber 2 of each cylinder of the engine 1, a fuel supply pump (not shown) for pressurizing sucked fuel to raise its pressure and for pressing and supplying the high pressure fuel to the common rail, and an injector 3 for injecting and supplying the high pressure fuel accumulated in the common rail into the combustion chamber 2 of each cylinder of the engine 1. The fuel supply pump is provided with a well-known feed pump for pumping the fuel from a fuel tank, and a pressurizing chamber for pressurizing the sucked fuel. A suction check electromagnetic valve (suction check valve) 4 as an actuator for changing a fuel discharge amount from the fuel supply pump to the common rail is attached to the midpoint of the fuel intake passage from the feed pump to the pressurizing chamber.

The injector 3 is attached to the cylinder head of the engine 1 to correspond to each cylinder. The injector is an electromagnetic fuel injection valve constructed of a fuel injection nozzle containing therein a nozzle needle and a command piston, an electromagnetic valve 5 as an actuator for driving the nozzle needle in a valve opening direction, and a needle urging unit, such as a spring, for urging the nozzle needle in a valve closing direction. Incidentally, the high pressure fuel is fed to a fuel path formed in the inside of the injector 3 from the fuel supply pump driven by the crankshaft of the engine 1 through the common rail and the fuel supply pipe. Fuel injection from the injector 3 into the combustion chamber 2 of each cylinder of the engine 1 is performed by applying power to or stopping power to the electromagnetic valve 5 for controlling fuel pressure in a back pressure control chamber of the command piston coupled to the nozzle needle. That is, while the electromagnetic valve 5 of the injector 3 is being opened, the high-pressure fuel accumulated in the common rail is injected and supplied into the combustion chamber 2 of each cylinder of the engine 1.

The variable nozzle turbocharger includes a compressor housing 29 for coupling the intake pipes 24, 25, and a turbine housing 39 for coupling the exhaust pipes 35, 36. An intake air supply passage 41 communicating with the intake path of the intake pipes 24 to 26 is formed in the inside of the compressor housing 29. An exhaust gas discharge passage 42 communicating with the exhaust path of the exhaust pipes 34 to 36 is formed in the inside of the turbine housing 39. A rotor shaft 43 is rotatably supported by the compressor housing 29 and the turbine housing 39 around its center axis.

A compressor wheel 44 having plural compressor blades (vanes, wings) is attached to one end of the rotor shaft 43 in the center axial line direction (axial direction). The compressor wheel 44 is rotatably contained in the compressor housing 29 so as to supercharge the intake air flowing in the intake air supply passage 41. A turbine wheel 45 having plural turbine blades (vanes, wings) is attached to the other end of the rotor shaft 43 in the axial direction. The turbine wheel 45 is rotatably accommodated in the turbine housing 39 so that the exhaust gas flowing in the exhaust gas discharge passage 42 rotates the turbine wheel 45.

The intake air supply passage 41 is formed to have a spiral shape along the rotation direction of the compressor wheel 44 so as to surround the outer periphery of the compressor wheel 44. The exhaust gas discharge passage 42 is formed to have a spiral form along the rotation direction of the turbine wheel 45 so as to surround the outer periphery of the turbine wheel 45. The exhaust gas discharge passage 42 of this embodiment is provided with a variable nozzle 46 for changing an exhaust gas flow area of the exhaust gas discharge passage 42 and causing the flow rate of the exhaust gas blown into the turbine wheel 45 to be variable. An opening degree of the variable nozzle 46 is varied by an actuator 6 such as, for example, a stepping motor. For example, when the variable nozzle 46 is closed, the flow rate of the exhaust gas blown into the turbine wheel 45 increases. When the variable nozzle 46 is opened, the flow rate of the exhaust gas blown into the turbine wheel 45 decreases.

The exhaust gas recirculation device includes an exhaust gas recirculation pipe 51 for introducing a part of the exhaust gas flowing in the exhaust path of the exhaust pipe 34 of the engine 1 into the intake path of the intake pipe 26 of the engine 1, and an exhaust gas recirculation volume control valve (hereinafter referred to as an EGR control valve) 53 for adjusting the recirculation volume (EGR volume) of the EGR gas flowing in the exhaust gas recirculation passage 52 of the exhaust gas recirculation pipe 51. The upstream end of the exhaust gas recirculation pipe 51 branches from the coupling part between the exhaust pipes 34 and 35, and the downstream end thereof is connected to the coupling part between the intake pipes 25 and 26. The EGR control valve 53 includes a valve (valve body) 54 for causing the recirculation volume (EGR volume) of the exhaust gas recirculation gas (EGR gas), which is a part of the exhaust gas of the engine 1 and is mixed in the intake air, to be variable by changing exhaust gas flow area of the exhaust gas recirculation passage 52, an electromagnetic or electric actuator 7 for driving the valve 54 in the valve opening direction, and a valve urging unit (not shown), such as a spring, for urging the valve 54 in the valve closing direction.

An ECU 9 includes a microcomputer having a well-known structure including a CPU for performing control processing and arithmetic processing, a storage device (memory such as a ROM or EEPROM, and a RAM or standby RAM) for holding various programs and data, and functions of an input circuit, an output circuit, a power supply circuit and the like, a pump drive circuit for applying SCV drive current (pump drive current) to a suction check valve 4 of the fuel supply pump, an injector drive circuit for applying INJ drive current (injector drive current) to an electromagnetic valve 5 of the injector 3, a variable nozzle drive circuit for applying VNT drive current to an actuator 6 of the variable nozzle 46, and an EGR drive circuit for applying EGR drive current to an actuator 7 of the EGR control valve 53.

When an ignition switch is turned on (IG•ON), ECU power is supplied, and the ECU 9 performs feedback control on the basis of a control program stored in the memory so that for example, the supercharging pressure of the intake air or the exhaust gas recirculation volume (EGR volume) is turned to a control command value. The ECU 9 is constructed such that when the ignition switch is turned off (IG•OFF) and the ECU power is off, the control on the basis of the control program stored in the memory is forcibly ended. The ECU 9 is constructed such that after sensor signals from various sensors and a switch signal from a partial switch mounted in a vehicle are A/D converted by an A/D converter, they are inputted to the microcomputer incorporated in the ECU 9. A crank angle sensor 61, an accelerator opening degree sensor 62, a coolant temperature sensor 63, an intake pressure sensor 64, an air flow sensor 65 and the like, which are operation condition detection units for detecting the operation states and operation conditions of the engine 1, are connected to the input circuit of the microcomputer.

The crank angle sensor 61 functions as a crank angle detection unit for detecting a rotation angle of the crankshaft of the engine 1. The crank angle sensor 61 is constructed of an electromagnetic pickup coil provided opposite to the outer periphery of an NE timing rotor (not shown) attached to the crankshaft of the engine 1. Plural convex teeth are disposed at intervals of a specified rotation angle on the outer peripheral surface of the NE timing rotor. In the crank angle sensor 61, the convex teeth of the NE timing rotor repeat approach/moving away to/from the crank angle sensor 61, so that pulse-like rotation position signals (NE signal pulses) are outputted by electromagnetic induction. The ECU 9 corresponds to a rotation speed detection unit for detecting the engine rotation speed (hereinafter also referred to as engine rotation number: NE) by measuring time intervals of the NE signal pulses outputted by the crank angle sensor 61.

The accelerator positioning sensor 62 functions as an accelerator opening degree detection unit for detecting an accelerator operation amount (hereinafter referred to as an accelerator opening degree) as a stepped amount of an accelerator pedal. The cooling water temperature sensor 63 functions as a cooling water temperature detection unit for detecting engine cooling water temperature. The intake pressure sensor 64 functions as an intake air pressure detection unit for detecting pressure (hereinafter referred to as actual intake pressure) of fresh intake air flowing in the intake path of the intake pipe 25 at the downstream side of the compressor housing 29. The air flow sensor 65 functions as an intake air volume detection unit for detecting a flow rate of fresh intake air (hereinafter referred to as an actual fresh intake air volume) flowing in the intake path of the intake pipe 24 at the downstream side of the air cleaner case 23.

Control Method of First Embodiment

Next, a control method of a supercharging pressure control by an opening degree control of the variable nozzle 46 of the variable nozzle turbocharger of this embodiment and an EGR control by an opening degree control of the EGR control valve 53 of the exhaust gas recirculation device will be described in brief with reference to FIGS. 1 to 4.

The ECU 9 includes the rotation speed detection unit for calculating the engine rotation speed (NE) by measuring the time intervals of the NE signal pulses taken from the crank angle sensor 61, an injection quantity determination unit for calculating a command injection quantity (QFIN) by adding an injection quantity correction amount in view of engine cooling water temperature (THW) detected by the cooling water temperature sensor 63 and the like to a basic injection quantity (Q) set according to the engine rotation speed (NE) detected by the rotation speed detection unit such as the crank angle sensor 61 and the accelerator opening degree (ACCP) detected by the accelerator opening degree sensor 62, and an injection timing determination unit for calculating a command injection timing (TFIN) of each cylinder of the engine 1 by the command injection quantity (QFIN) and the engine rotation speed (NE).

The ECU 9 includes an injection period determination unit for calculating an energization time (command injection pulse time, command injection period: TQ) of the electromagnetic valve 5 of the injector 3 from the command injection quantity (QFIN) and an actual fuel pressure (common rail pressure: PC) detected by a common rail pressure sensor (not shown), and an injector drive unit for driving the injector 3 to open the valve by applying a pulse-like INJ drive current (injection command pulse) to the electromagnetic valve 5 of the injector 3 of each cylinder of the engine 1 through the injector drive circuit. The ECU 9 includes a fuel pressure determination unit for calculating a target fuel pressure (PFIN) by the engine rotation speed (NE) and the accelerator opening degree (ACCP), and a discharge rate control unit for feedback controlling the SCV drive current value to be applied to the suction check valve 4 of the fuel supply pump on the basis of a deviation ($\Delta P$) between the actual fuel pressure (PC) and the target fuel pressure (PFIN) so that the actual fuel pressure (PC) substantially coincides with the target fuel pressure (PFIN).

Figure 3:
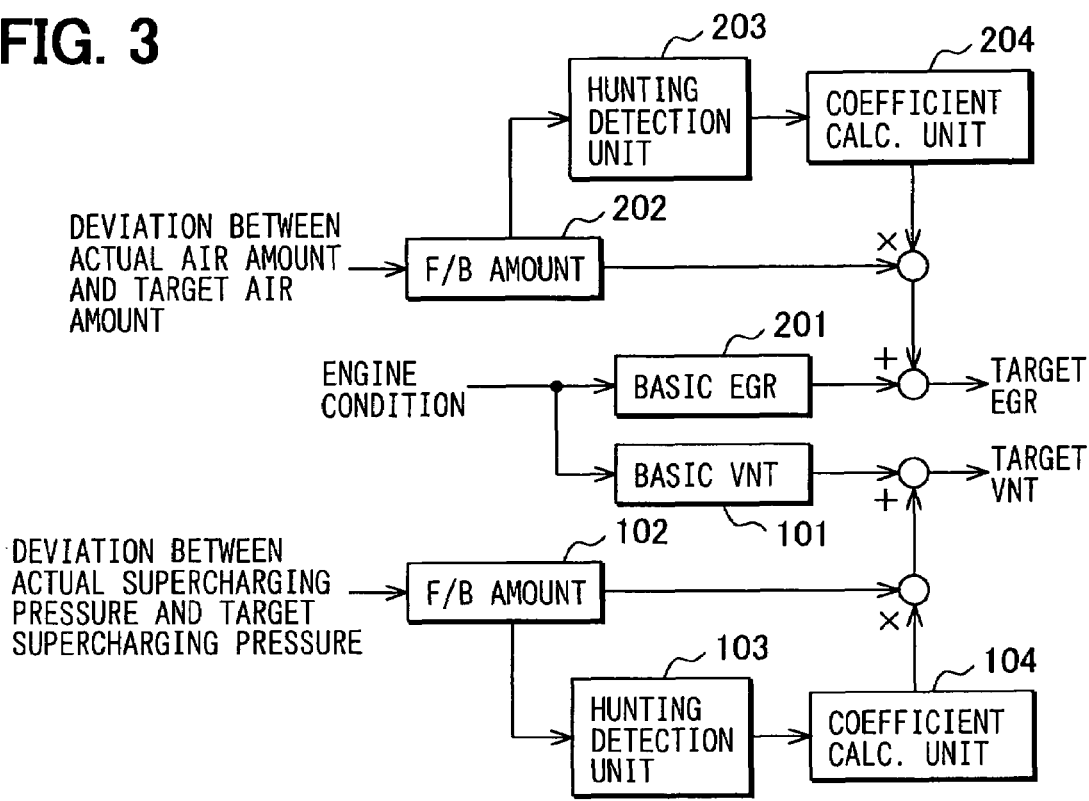
FIG. 3 is a block diagram showing control logic of an ECU according to the first embodiment.

Here, a control logic of FIG. 3 shows a method of calculating a target VNT opening degree (target opening degree of the variable nozzle 46, opening area of the exhaust gas discharge passage 42) of the variable nozzle turbocharger and a target EGR opening degree (target opening degree of the EGR control valve 53, opening area of the exhaust gas recirculation passage 52) of the exhaust gas recirculation device by using well-known PID (Proportional-plus-Integral-plus-Derivative) control.

The ECU 9 includes a supercharging pressure (VNT) control unit for feedback controlling the opening degree (exhaust gas flow area of the exhaust gas discharge passage 42) of the variable nozzle 46 of the variable nozzle turbocharger on the basis of a deviation ($\Delta AP$) between the actual intake pressure and the target intake pressure so that the actual intake pressure detected by the intake pressure sensor 64 substantially coincides with the target intake pressure set according to the operation state of the engine 1. This is constructed of a basic VNT opening degree determination unit 101 for setting a basic VNT opening degree (first basic controlled variable) corresponding to the operation state of the engine 1, a feedback amount calculation unit 102 for calculating a first feedback amount to the basic VNT opening degree on the basis of a deviation ($\Delta AP$) between the actual intake pressure and the target intake pressure, a hunting detection unit 103 for judging, on the basis of a variation in the first feedback amount, whether or not the target VNT opening degree (first control command value) is in a hunting state, and a gain correction coefficient calculation unit 104 for calculating a first gain correction coefficient ($\alpha$).

The ECU 9 includes an exhaust gas recirculation volume (EGR) control unit for feedback controlling an opening degree (exhaust gas flow area of the exhaust gas recirculation passage 52) of the EGR control valve 53 of the exhaust gas recirculation device on the basis of a deviation between the actual fresh intake air volume and the target fresh intake air volume so that the actual fresh intake air volume detected by the air flow sensor 65 substantially coincides with the target fresh intake air volume set according to the operation state of the engine 1. This is constructed of a basic EGR opening degree determination unit 201 for setting a basic EGR opening degree (second basic controlled variable) according to the operation state of the engine 1, a feedback amount calculation unit 202 for calculating a second feedback amount to the basic EGR opening degree on the basis of a deviation between the actual fresh intake air volume and the target fresh intake air volume, a hunting detection unit 203 for judging, on the basis of a variation in the second feedback amount, whether or not the target EGR opening degree (second control command value) is in a hunting state, and a gain correction coefficient calculation unit 204 for calculating the second gain correction coefficient.

First, the basic VNT opening degree and the target intake pressure are set according to, for example, the engine rotation speed (NE) and the accelerator opening degree (ACCP). Alternatively, they are set according to the command injection quantity (QFIN) and the engine rotation speed (NE). The basic VNT opening degree and the target intake pressure may be calculated by using a characteristic diagram or an arithmetic expression prepared by previously measuring these relations by experiments or the like.

Next, the first feedback amount is calculated according to the following equation (1).

$$\text{First feedback amount} = Kpa \times \Delta AP + Kia \times \int \Delta AP + Kda \times d/dt \Delta AP \quad (1)$$

Here, Kpa denotes a gain (also called a proportional gain) of a proportional term, Kja denotes again (also called an integral gain) of an integral term, and Kda denotes a gain (also called a derivative gain) of a derivative term. Besides, $\Delta AP$ denotes a deviation between the actual intake pressure and the target intake pressure {(actual intake pressure)−(target intake pressure) or (target intake pressure)−(actual intake pressure)}.

Next, on the basis of an equation (2) set forth below, a first feedback correction value is calculated by multiplying the first feedback amount by a first gain correction coefficient ($\alpha$).

$$\text{First feedback correction value} = \text{First feedback amount} \times \alpha \quad (2)$$

Here, the first gain correction coefficient ($\alpha$) is 1.0 or more (for example, 1.0 to 1.9) in a case where an absolute value of the first feedback amount is increased.

Next, on the basis of an equation (3) set forth below, the first feedback correction value is added to the basic VNT opening degree, and the target VNT opening degree (first control command value) is calculated.

$$\text{Target VNT opening degree} = \text{Basic VNT opening degree} + \text{First feed back correction value} \quad (3)$$

Here, when the index value A indicating the specified hunting state of the target VNT opening degree exceeds a predetermined value, the hunting detection unit 103 determines that the target VNT opening degree is in a hunting state, and outputs a signal to the gain correction coefficient calculation unit 104 to change the gain correction coefficient. In this embodiment, in the case where the frequency of the target VNT opening degree exceeds the predetermined value, that is, in the case where the oscillation frequency per unit time of the first feedback amount used for the calculation of the target VNT opening degree exceeds the predetermined value, it is judged that the target VNT opening degree is in the hunting state.

Figure 4A:
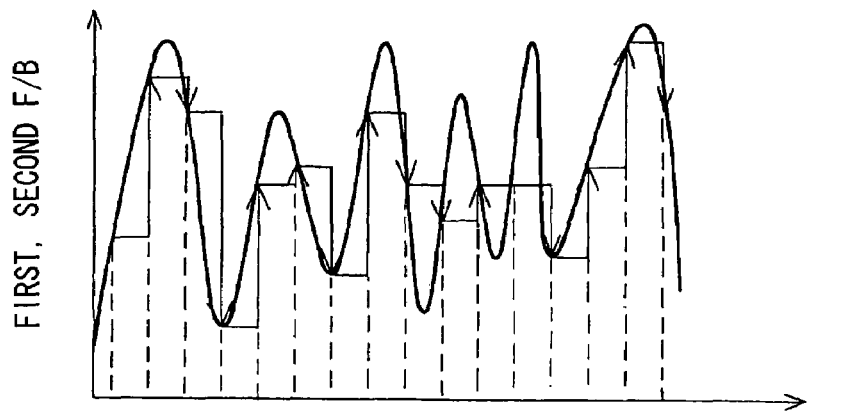
FIGS. 4A and 4B are graphs for explaining a method for determining a hunting state by a hunting detection unit according to the first embodiment.
Figure 4B:
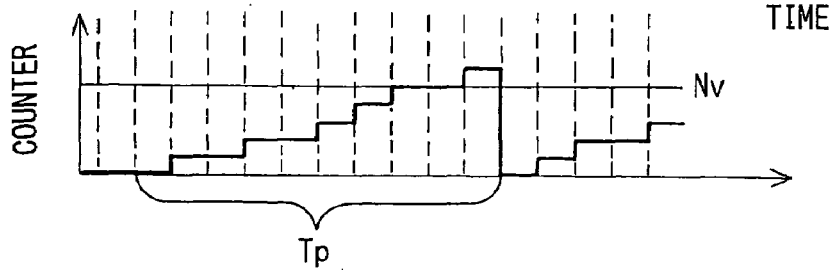

Specifically, as shown in FIGS. 4A and 4B, the direction of change of the first feedback amount at every constant period is detected, and the number of times of inversion of increase and decrease in the direction of the change of the first feedback amount during a definite period of time is counted. That is, when the direction of the change of the first feedback amount is inverted from the increasing direction to the decreasing direction, a control flag A is set, and count-up (counter C+1) is made, and when the direction of the change of the first feedback amount is inverted from the decreasing direction to the increasing direction, a control flag B is set and count-up (counter C+1) is made. The number of times of inversion (count number) of the increase and decrease in the direction of the change of the first feedback amount during the definite period of time is made the hunting detection parameter (index value A) indicating the hunting state of the target VNT opening degree.

In the case where the number of times of inversion (count value) of increase and decrease in the direction of the change of the first feedback amount during the definite period of time exceeds the judgment value Nv (for example, 6) as a previously determined fixed value, it is determined that the target VNT opening degree is in the hunting state, and the first hunting flag of the target VNT opening degree is set. Incidentally, after the hunting of the target VNT opening degree is once detected and the first hunting flag is set, the direction of the change of the first feedback amount at every constant period is detected, and the number of times of inversion of increase and decrease in the direction of the change of the first feedback amount during the definite period of time is counted. The number of times of inversion (count number) of increase and decrease in the direction of the change of the first feedback amount during the definite period Tp is made as the hunting detection parameter (index value B) indicating the convergence state of the hunting of the target VNT opening degree.

When the number of times of inversion (count number) of increase and decrease in the direction of the change of the first feedback amount during the definite period Tp lowered to the judgment value Nv (for example, 6) or less as the previously set fixed value, it is determined that the hunting of the target VNT opening degree is in the convergence state, and the first hunting flag may be cleared. Incidentally, the judgment value Nv of the count number (hunting detection parameter) during the definite period Tp is not limited to only 6, but is arbitrary, for example, 2 to 5, or 7 to 10. The judgment value Nv may be made to have hysteresis. For example, when the number of times of inversion (count number) of increase and decrease in the direction of the change of the first feedback amount during the definite period of time exceeds 6, it is determined that the target VNT opening degree is in the hunting state, and when the number of times of inversion (count number) of increase and decrease in the direction of the change of the first feedback amount during the definite period of time becomes 5 or less, it is determined that the hunting of the target VNT opening degree is in the convergence state.

Next, in the case where the hunting detection unit 103 detects the hunting of the target VNT opening degree, and the first hunting flag is set, the gain correction coefficient calculation unit 104 sets the first gain correction coefficient ($\alpha$) as a gain amount (fixed value) to decrease the absolute value of the first feedback amount. In the case where the absolute value of the first feedback amount is desired to be set small, a value (for example, 0.1 to 0.9) smaller than 1.0 is used as the first gain correction coefficient ($\alpha$). As described above, since the first feedback correction value obtained by multiplying the first feedback amount by the first gain correction coefficient ($\alpha$) is corrected so that the absolute value of the first feedback correction amount decreases, the target VNT opening degree is also corrected so that its absolute value decreases. That is, even if the target VNT opening degree is oscillated (hunting) at a specified frequency, the amplitude of the target VNT opening degree decreases.

In this embodiment, the target VNT opening degree (first control command value) calculated by the VNT control unit is converted into a target drive current value by using a specified conversion coefficient. The target drive current value is converted into a control pulse signal (pulse-like VNT drive signal) by using a specified conversion coefficient. The pulse-like VNT drive signal (VNT drive current) is applied to the actuator 6 of the variable nozzle 46, so that the supercharging pressure control (VNT) control by the feedback control is performed.

Accordingly, the ECU 9 drive-controls the actuator 6 on the basis of the deviation ($\Delta AP$) between the actual intake pressure and the target intake pressure so that the actual intake pressure detected by the intake pressure sensor 64 substantially coincides with the target intake pressure set according to the operation state of the engine 1, and opens/closes the variable nozzle 46, so that the flow rate of the exhaust gas blown into the turbine wheel 45 is adjusted. As stated above, the rotation speed of the turbine wheel 45, the rotor shaft 43, and the compressor wheel 44 is adjusted to a specified rotation speed by adjusting the flow rate of the exhaust gas blown into the turbine wheel 45. The fresh intake air volume forcibly sent into the combustion chamber 2 of the engine 1 is adjusted, and the intake air of the engine 1 is supercharged, so that the output of the engine 1 can be improved.

First, the basic EGR opening degree and the target fresh intake air volume are set according to, for example, the engine rotation speed (NE) and the accelerator opening degree (ACCP). Alternatively, they are set according to the command injection quantity (QFIN) and the engine rotation speed (NE). Incidentally, the basic EGR opening degree and the target fresh intake air volume may be calculated by using a characteristic diagram or an arithmetic equations prepared by previously measuring these relations by experiments or the like.

Next, on the basis of an equation (4) set forth below, the second feedback amount is calculated.

$$\text{Second feedback amount} = Kpb \times \Delta AQ + Kib \times \int \Delta AQ + Kdb \times d/dt \Delta AQ \quad (4)$$

Here, Kpb denotes a gain (also called a proportional gain) of a proportional term, Kib denotes again (also called an integral gain) of an integral term, and Kdb denotes a gain (also called a derivative gain) of a derivative term. Besides, $\Delta AQ$ denotes a deviation between the actual fresh intake air volume and the target fresh intake air volume {(actual fresh intake air volume)−(target fresh intake air volume) or (target fresh intake air volume)−(actual fresh intake air volume)}.

Next, on the basis of an equation (5) set forth below, a second feedback correction value is calculated by multiplying the second feedback amount by the second gain correction coefficient ($\beta$).

$$\text{Second feedback correction value} = \text{Second feedback amount} \times \beta \quad (5)$$

In the case where the absolute value of the second feedback amount is increased, a value of 1.0 or larger (for example, 1.0 to 1.9) is used as the second gain correction coefficient ($\beta$).

Next, on the basis of an equation (6) set forth below, the second feedback correction value is added to the basic EGR opening degree and the target EGR opening degree (second control command value) is calculated.

$$\text{Target EGR opening degree} = \text{Basic EGR opening degree} + \text{Second feedback correction value} \quad (6)$$

Here, when the index value indicating a specified hunting state of the target EGR opening degree exceeds a judgment value, the hunting detection unit 203 determines that the target EGR opening degree is in the hunting state, and outputs a signal to the gain correction coefficient calculation unit 204 to change the gain correction coefficient. In this embodiment, in the case where the frequency of the target EGR opening degree exceeds the judgment value, that is, in the case where the oscillation frequency per unit time of the second feedback amount used for the calculation of the target EGR opening degree exceeds the judgment value, it is determined that the target EGR opening degree is in the hunting state.

Specifically, as shown in FIGS. 4A and 4B, the direction of change of the second feedback amount at every constant period is detected, and the number of times of inversion of increase and decrease in the direction of the change of the second feedback amount during a definite period Tp is counted. That is, when the direction of the change of the second feedback amount is inverted from the increasing direction to the decreasing direction, a control flag A is set and count-up is made (counter C+1), and when the direction of the change of the second feedback amount is inverted from the decreasing direction to the increasing direction, a control flag B is set, and count-up (counter C+1) is made. Then, the number of times of inversion (count number) of increase and decrease in the direction of the change of the second feedback amount during the definite period of time is made the hunting detection parameter (index value A) indicating the hunting state of the target EGR opening degree.

In the case where the number of times of inversion (count number) of increase and decrease in the direction of the change of the second feedback amount during the definite period of time exceeds the judgment value (for example, 6) as a previously set fixed value, it is determined that the target EGR opening degree is in the hunting state, and the second hunting flag of the target EGR opening degree is set. Incidentally, after the hunting of the target EGR opening degree is once detected and the second hunting flag is set, the direction of the change of the second feedback amount at every constant period is detected, and the number of times of inversion of increase and decrease in the direction of the change of the second feedback amount during the definite period of time is counted. The number of times of inversion (count number) of increase and decrease in the direction of the change of the second feedback amount during the definite period of time is made as the hunting detection parameter (index value B) indicating the convergence state of the hunting of the target EGR opening degree.

When the number of times of inversion (count number) of increase and decrease in the direction of the change of the second feedback amount during the definite period of time is lowered to the judgment value (for example, 6) as a previously determined fixed value or less, it is determined that the hunting of the target EGR opening degree is in the convergence state, and the second hunting flag may be cleared. Incidentally, the judgment value of the count number (hunting detection parameter) during the definite period of time is not limited to only 6, but is arbitrary, for example, 2 to 5 or 7 to 10. The judgment value may be made to have hysteresis. For example, when the number of times of inversion (count number) of increase and decrease in the direction of the change of the second feedback amount during the definite period of time exceeds 6, it may be determined that the target EGR opening degree is in the hunting state. When the number of times of inversion (count number) of increase and decrease in the direction of the change of the second feedback amount during the definite period of time becomes 5 or less, it may be determined that the hunting of the target EGR opening degree is in the convergence state.

Next, in the case where the hunting of the target EGR opening degree is detected by the hunting detection unit 203, the gain correction coefficient calculation unit 204 calculates such second gain correction coefficient ($\alpha$) that the absolute value of the feedback amount is decreased with respect to the second feedback amount. Incidentally, in the case where the absolute value of the second feedback amount is desired to be decreased, a value (for example, 0.1 to 0.9) smaller than 1.0 is used as the second gain correction coefficient ($\alpha$). The second feedback correction value is corrected such that the absolute value of the second feedback correction amount becomes small, and the target EGR opening degree is also corrected such that its absolute value becomes small. That is, even if the target EGR opening degree is oscillated at a specified frequency, the amplitude of the target EGR opening degree decreases.

In this embodiment, the target EGR opening degree (second control command value) calculated by the EGR control unit is converted into a target drive current value by using a specified conversion coefficient. The target drive current value is converted into a control pulse signal (pulse-like drive signal) by using a specified conversion coefficient. The pulse-like EGR drive signal (EGR drive current) is applied to the actuator 7 of the EGR control valve 53, so that the exhaust gas recirculation volume (EGR) control by the feedback control is performed.

Accordingly, the ECU 9 drive-controls the actuator 7 on the basis of the deviation ($\Delta AQ$) between the actual fresh intake air volume and the target fresh intake air volume so that the actual fresh intake air volume detected by the air flow sensor 65 substantially coincides with the target fresh intake air volume set according to the operation state of the engine 1, and opens/closes the valve 54 of the EGR control valve 53, so that the recirculation volume (EGR volume) of the exhaust gas recirculation gas (EGR gas) flowing in the exhaust gas recirculation passage 52 of the exhaust gas recirculation pipe 51 is adjusted. By this, the EGR gas as a part of the exhaust gas of the engine 1 is mixed into the intake air flowing in the intake path of the intake pipes 25 and 26, so that highest combustion temperature in the combustion chamber 2 of the engine 1 is lowered, and harmful material (for example, nitride oxide) included in the exhaust gas can be reduced. The EGR volume to be recirculated back to the intake path of the intake pipes 25 and 26 is adjusted to an optimum value, so that the lowering degree of the output of the engine 1 and the lowering degree of the drivability of the engine 1 can be suppressed.

Effect of First Embodiment

As described above, in the engine control system of this embodiment, in the case where the hunting of the target VNT opening degree is detected, the first and the second gain correction coefficients ($\alpha$, $\beta$) to be multiplied to the first and the second feedback amounts respectively are changed to such values that the respective absolute values of the first and the second feedback amounts become small. By this, the first and the second feedback amounts are multiplied by such first and second gain correction coefficients ($\alpha$, $\beta$) that the absolute values of the first and the second feedback amounts become small, and the first and the second feedback correction values are obtained, and further, the first and the second feedback correction values are added to the basic VNT opening degree and the basic EGR opening degree to obtain the target VNT opening degree and the target EGR opening degree. Thus, the hunting of the target VNT opening degree of the VNT control and the target EGR opening degree of the EGR control can be prevented.

In the engine control system of this embodiment, in the case where the hunting of the target EGR opening degree is detected, as described above, the first and the second gain correction coefficients ($\alpha$, $\beta$) to be multiplied to the first and the second feedback amounts respectively are changed to such values that the respective absolute values of the first and the second feedback amounts become small. By this, the first and the second feedback amounts are respectively multiplied by such first and second gain correction coefficients ($\alpha$, $\beta$) that the absolute values of the first and the second feedback amounts become small, and the first and the second feedback correction values are obtained, and further, the first and the second feedback correction values are added to the basic VNT opening degree and the basic EGR opening degree to obtain the target VNT opening degree and the target EGR opening degree. Accordingly, the hunting of the target VNT opening degree of the VNT control and the target EGR opening degree of the EGR control can be prevented.

Accordingly, in the engine control system of this embodiment, in the case where the hunting of the target VNT opening degree or the target EGR opening degree is detected, even if the valve 54 of the EGR control valve 53 is opened on the basis of the deviation between the actual fresh intake air volume and the target fresh intake air volume, the opening degree of the valve 54 of the EGR control valve 53 is limited, and therefore, a drop in pressure of the "A" area of the exhaust path from the exhaust port 21 of the engine 1 to the variable nozzle 46 of the variable nozzle turbocharger and the exhaust gas recirculation passage 52 at the exhaust path side of the EGR control valve 53 is also limited. By this, the flow rate of the exhaust gas blown into the turbine wheel 45 from the exhaust path of the engine 1 does not become very slow, and the lowering of the rotation speed of the turbine wheel 45 is suppressed.

Thus, the lowering of the rotation speed of the compressor wheel 44 coupled to the turbine wheel 45 through the rotor shaft 43 is also suppressed, and the lowering degree of the actual intake pressure (=actual supercharging pressure) is also limited, and therefore, a reduced amount of the opening degree of the variable nozzle 46 on the basis of the deviation between the actual intake pressure and the target intake pressure, in order to secure the target intake pressure, may be small. As a result, even if the opening degree of the variable nozzle 46 is reduced, a rise in pressure of the "A" area is decreased, and the amount of increase of the exhaust gas recirculation volume (EGR volume) passing through the exhaust gas recirculation passage 52 is also decreased. By this, since the amount of decrease of the actual fresh intake air volume is suppressed, hunting of the valve 54 of the EGR control valve 53 does not easily occur.

Accordingly, it is possible to prevent that the supercharging pressure of the intake air of the engine 1 becomes unstable since the variable nozzle 46 is opened and closed at constant period intervals, and the hunting of the variable nozzle 46 can also be prevented. It is possible to prevent that the EGR volume becomes unstable since the valve 54 of the EGR control valve 53 is driven to the valve open side or the valve close side at constant period intervals, and the hunting of the valve 54 of the EGR control valve 53 can also be prevented.

In the case where the convergence state of the hunting of the target VNT opening degree and the target EGR opening degree is detected after the hunting of the target VNT opening degree and the target EGR opening degree is detected, the first and the second gain correction coefficient to the first and the second feedback amounts are raised respectively, and the limitation of the absolute values of the first and the second feedback amounts is removed, so that the followability (followingness) of the actual intake pressure relative to the target intake pressure of the VNT control and the followability (followingness) of the actual fresh intake air volume relative to the target fresh intake air volume of the EGR control can be returned.

Incidentally, the first and the second gain correction coefficients may be made variable according to the magnitude of the oscillation frequency per unit time of the first feedback amount of the VNT control and the oscillation frequency per unit time of the second feedback amount of the EGR control. Alternatively, in the case where the convergence state of the hunting of the target VNT opening degree and the target EGR opening degree is detected, the first and the second gain correction coefficients multiplied to the first and the second feedback amounts may be removed.

Second Embodiment

Figure 5A:
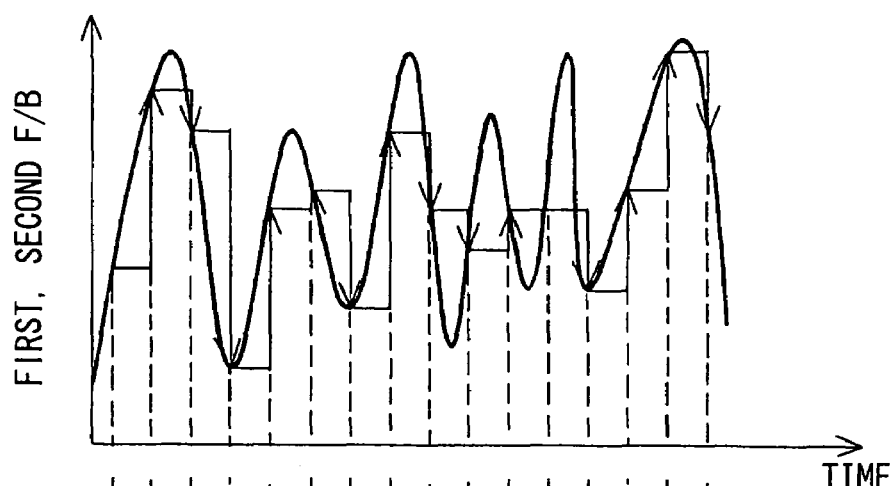
FIGS. 5A and 5B are graphs for explaining a method for determining a hunting state by a hunting detection unit according to a second embodiment of the present invention.
Figure 5B:
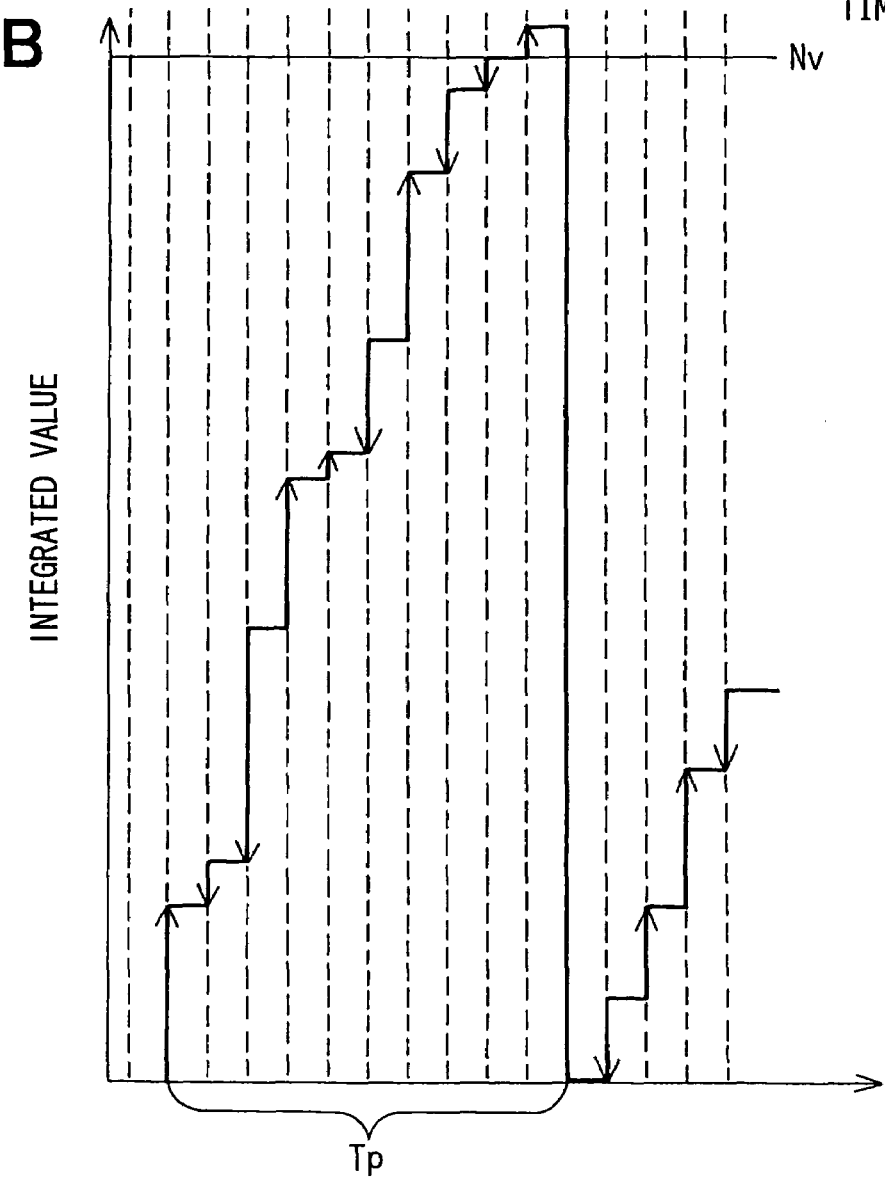

FIGS. 5A and 5B show a second embodiment of the invention, in which FIGS. 5A and 5B are views showing a judgment method of a hunting state by a hunting detection unit.

When a hunting detection parameter (index value A) indicating a specified hunting state of a target VNT opening degree exceeds a judgment value Nv, a hunting detection unit 103 of this embodiment judges that the target VNT opening degree is in the hunting state, and outputs a signal to a gain correction coefficient calculation unit 104 to change a gain correction coefficient. When a hunting detection parameter (index value B) indicating a convergence state of the hunting of the target VNT opening degree is a judgment value or less, it is determined that the hunting of the target VNT opening degree is in a convergence state, and a signal is outputted to the gain correction coefficient calculation unit 104 to remove the multiplication of the gain correction coefficient or to change the gain correction coefficient.

Specifically, as shown in FIGS. 5A and 5B, a variation of a first feedback amount at every constant period is integrated. An integrated amount in a definite period of time is made the hunting detection parameter (the index value A and the index value B). In the case where the integrated amount during the definite period of time exceeds the judgment value, it is determined that the target VNT opening degree is in the hunting state. In the case where the integrated amount during the definite period of time is the judgment value or less, it is determined that the hunting of the target VNT opening degree is in the convergence state.

When a hunting detection parameter (index value A) indicating a specified hunting state of a target EGR opening degree exceeds a judgment value, a hunting detection unit 203 determines that the target EGR opening degree is in a hunting state, and outputs a signal to a gain correction coefficient calculation unit 204 to change a gain correction coefficient. When a hunting detection parameter (index value B) indicating a convergence state of the hunting of the target EGR opening degree is a judgment value or less, it is determined that the hunting of the target EGR opening degree is in the convergence state, and a signal is outputted to the gain correction coefficient calculation unit 204 to remove the multiplication of the gain correction coefficient or to change the gain correction coefficient.

Specifically, as shown in FIGS. 5A and 5B, a variation of a second feedback amount at every constant period is integrated. An integrated amount in a definite period of time is made the hunting detection parameter (the index value A and the index value B). In the case where the integrated amount during the definite period of time exceeds the judgment value, it is determined that the target EGR opening degree is in the hunting state. In the case where the integrated amount during the definite period of time is the judgment value or less, it is determined that the hunting of the target EGR opening degree is in the convergence state.

Incidentally, in the (integrated value of the oscillation amount of the target VNT opening degree or the target EGR opening degree)/(unit time) as in this embodiment, the frequency component (severity of the oscillation) is added to the magnitude of the oscillation of the target VNT opening degree or the target EGR opening degree, and the hunting detection parameter can also be obtained.

Third Embodiment

Figure 6:
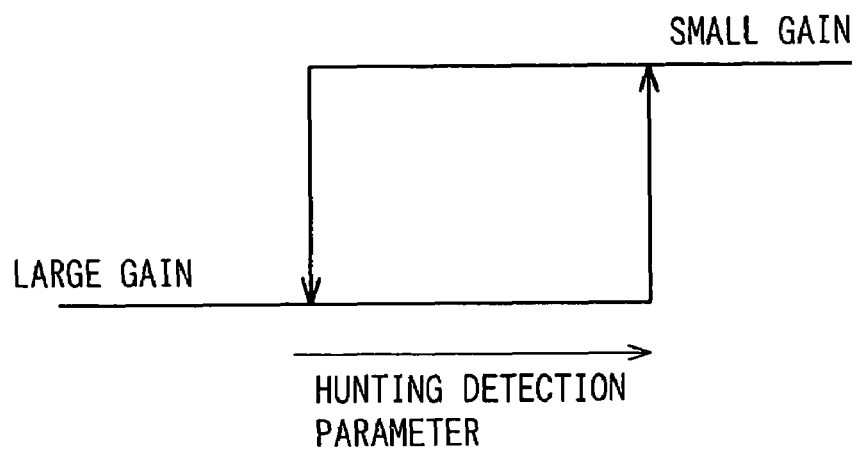
FIG. 6 is a graph for explaining a calculation method of a gain amount with respect to a hunting detection parameter according to a third embodiment of the present invention.

FIG. 6 shows a third embodiment of the invention, and is a view showing a calculation method of a gain amount to a hunting detection parameter.

In this embodiment, a flag is created according to the magnitude of a hunting detection parameter (index value A) indicating a specified hunting state of a target VNT opening degree or a target EGR opening degree, and a first and a second gain correction coefficients (gain amounts) may be selected on the basis of the state of the flag.

Specifically, in the case where the hunting detection parameter (index value A) exceeds a judgment value, that is, in the case where the number of times of invention of increase and decrease of the first or the second feedback amount during the definite period of time (first embodiment) or the integrated amount of the variation amount of the first or the second feedback amount during the definite period of time (second embodiment) exceeds the judgment value, the magnitude of the hunting detection parameter during the definite period of time is obtained.

As the hunting detection parameter during the definite period of time becomes large, the first or the second gain correction coefficient (gain amount) is set to a small value (for example, 0.1 to 0.4). As the hunting detection parameter (index value) during the definite period of time becomes small, the first or the second gain correction coefficient (gain amount) is set to a large value (for example, 0.5 to 0.9). This is an example in which such first and second gain correction coefficients (gain amounts) as to decrease the absolute values of the first and the second feedback amounts are made variable according to the magnitude of the hunting detection parameter (index value A).

A flag is created according to the magnitude of the hunting detection parameter (index value B) indicating the convergence state of the hunting of the target VNT opening degree or the target EGR opening degree, and the first and the second gain correction coefficients (gain amounts) may be selected on the basis of the state of the flag.

Specifically, in the case where the hunting detection parameter (index value B) is a judgment value or less, that is, in the case where the number of times of inversion of increase and decrease of the first or the second feedback amount during the definite period of time (first embodiment) or the integrated amount of the variation amount of the first or the second feedback amount during the definite period of time (second embodiment) is the judgment value or less, the magnitude of the hunting detection parameter during the definite period of time is obtained.

As the hunting detection parameter during the definite period of time becomes large, the first or the second gain correction coefficient (gain amount) is set to a small value (for example, 1.0 to 1.4). As the hunting detection parameter (index value) during the definite period of time becomes small, the first or the second gain correction coefficient (gain amount) is set to a large value (for example, 1.5 to 1.9). This is an example in which such first and second gain correction coefficients (gain amounts) as to increase the absolute values of the first and the second feedback amounts are made variable according to the magnitude of the hunting detection parameter (index value B).

Fourth Embodiment

Figure 7:
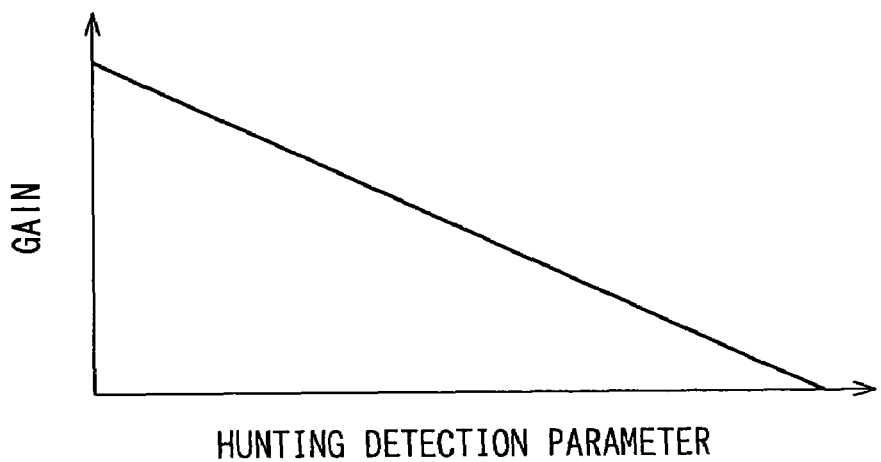
FIG. 7 is a graph for explaining a calculation method of a gain amount with respect to a hunting detection parameter according to a fourth embodiment of the present invention.

FIG. 7 shows a fourth embodiment of the invention, and is a view showing a calculation method of a gain amount to a hunting detection parameter.

In this embodiment, a first and a second gain correction coefficients (gain amounts) may be interpolation-calculated by using a characteristic diagram (MAP: see FIG. 7) showing the change of a first and a second gain correction coefficients (gain amounts) with respect to the magnitude of a hunting detection parameter (index value A) indicating a specified hunting state of a target VNT opening degree or a target EGR opening degree.

Specifically, in the case where the hunting detection parameter (index value A) exceeds the judgment value, that is, in the case where the number of times of inversion of increase and decrease of the first or the second feedback amount during the definite period of time (first embodiment), or the integrated amount of the variation of the first or the second feedback amount during the definite period of time (second embodiment) exceeds the judgment value, the magnitude of the hunting detection parameter during the definite period of time is obtained. As the hunting detection parameter during the definite period of time becomes large, the first or the second gain correction coefficient (gain amount) is set to a small value. This is an example in which such first and second gain correction coefficients (gain amounts) as to decrease the absolute values of the first and the second feedback correction amounts are made variable according to the magnitude of the hunting detection parameter (index value A).

The first and the second gain correction coefficients (gain amounts) may be interpolation-calculated by using a characteristic diagram (MAP) indicating the change of the first and the second gain correction coefficients (gain amounts) with respect to the magnitude of the hunting detection parameter (index value B) indicating the convergence state of the hunting of the target VNT opening degree or the target EGR opening degree.

Specifically, in the case where the hunting detection parameter (index value B) is the judgment value or less, that is, in the case where the number of times of inversion of increase and decrease of the first or the second feedback amount during the definite period of time (first embodiment) or the integrated amount of the variation amount of the first or the second feedback amount during the definite period of time (second embodiment) is the judgment value or less, the magnitude of the hunting detection parameter during the definite period of time is obtained. As the hunting detection parameter during the definite period of time becomes large, the first or the second gain correction coefficient (gain amount) is set to a small value. This is an example in which such first and second gain correction coefficients (gain amounts) as to increase the absolute values of the first and the second feedback amounts are made variable according to the magnitude of the hunting detection parameter (index value B).

MODIFIED EXAMPLES

In the embodiments, in the case where the hunting of the target VNT opening degree or the target EGR opening degree is detected, such first and second gain correction coefficients (gain amounts) as to decrease the absolute values of the first and the second feedback amounts are multiplied to obtain the target VNT opening degree and the target EGR opening degree. However, in the case where the hunting of the target VNT opening degree is detected, the target VNT opening degree may be obtained by multiplying such first gain correction coefficient (gain amount) as to decrease only the absolute value of the first feedback amount. In the case where the hunting of the target EGR opening degree is detected, the target EGR opening degree may be obtained by multiplying such second gain correction coefficient (gain amount) as to decrease only the absolute value of the second feedback amount.

In the embodiments, the invention is applied to the engine control system including at least the accumulator fuel injection device for injection supplying the high pressure fuel into the combustion chamber 2 of each cylinder of the engine 1, the variable nozzle turbocharger for supercharger the intake air of the engine 1, the exhaust gas recirculation device for recirculating a part of the exhaust gas of the engine 1 to the intake side, and the ECU 9 for electronically controlling these. However, the invention may be applied to an engine control system including at least a variable nozzle turbocharger, an exhaust gas recirculation device, and an ECU 9 for electronically controlling these. The invention may be applied to, instead of the accumulator fuel injection device, a fuel injection device for an internal combustion engine of a type in which a common rail is not included, and high pressure fuel is directly supplied from a fuel supply pump to a fuel injection nozzle.

In the embodiments, the invention is applied to the method of, by the PID control, feedback controlling the supercharging pressure of the intake air of the engine 1, and the method of feedback controlling the exhaust gas recirculation volume (EGR volume). However, the invention may be applied to a method of, by PI (Proportional-plus-Integral) control or PD (Proportional-plus-Derivative) control, feedback controlling the supercharging pressure of intake air of the engine 1 and a method of feedback controlling exhaust gas recirculation volume (EGR volume). Instead of the first and the second gain correction coefficients (gain amounts) to be multiplied to the first and the second feedback amounts, such a feedback gain (proportional gain or integral gain) as to decrease an absolute value of a proportional term or an integral term may be used.

Incidentally, it is desirable that the control of pump (SCV) drive current to be applied to the suction check valve (SCV) 4 of the fuel supply pump is performed by duty (DUTY) control. That is, the duty control is used in which a lift amount of the suction check valve 4 and an opening area of the suction check valve 4 are changed by adjusting a ratio (energization time ratio•duty ratio) of ON/OFF of a control pulse signal (pulse-like SCV drive signal) per unit time according to a pressure deviation (ΔP) between an actual fuel pressure (PC) and a target fuel pressure (PFIN), so that high precision digital control becomes possible. Thus, the control responsiveness and the followingness of the actual fuel pressure (PC) relative to the target fuel pressure (PFIN) can be improved.

It is desirable that the control of VNT drive current to be applied to the actuator 6 of the variable nozzle 46 of the variable nozzle turbocharger is performed by duty (DUTY) control. That is, the duty control is used in which the opening degree of the variable nozzle 46 and the exhaust gas flow area of the exhaust gas discharge passage 42 are changed by adjusting a ratio (energization time ratio•duty ratio) of ON/OFF of a control pulse signal (pulse-like VNT drive signal) per unit time according to a deviation (ΔAP) between an actual intake pressure (=actual supercharging pressure) and a target intake pressure (=target supercharging pressure), so that high precision digital control becomes possible. The control responsiveness and the followingness of the actual intake pressure (=actual supercharging pressure) relative to the target intake pressure (=target supercharging pressure) can be improved.

It is desirable that the control of EGR drive current to be applied to the actuator 7 of the EGR control valve 53 of the exhaust gas recirculation device is performed by duty (DUTY) control. That is, the duty control is used in which a lift amount of the EGR control valve 53 and an exhaust gas flow area of the exhaust gas recirculation passage 52 are changed by adjusting a ratio (energization time ratio duty ratio) of ON/OFF of a control pulse signal (pulse-like EGR drive signal) per unit time according to a deviation (ΔAQ) between an actual fresh intake air volume and a target fresh intake air volume, so that high precision digital control becomes possible. The control responsiveness and the followingness of the actual fresh intake air volume relative to the target fresh intake air volume can be improved.

In the embodiments, the airflow sensor 65 is used as the intake air volume sensor (intake air volume detection unit) for detecting the flow rate (fresh intake air volume) of the fresh intake air sucked into the combustion chamber 2 of the cylinder of the engine 1. However, as the intake air volume sensor (intake air volume detection unit), an intake pipe pressure system may be used in which an intake pipe negative pressure at the downstream side of the throttle valve is detected by a pressure sensor, and this and the engine rotation speed are subjected to an arithmetic operation by the ECU 9, so that the intake air volume is indirectly obtained. As the intake air volume sensor (intake air volume detection unit), a potentiometer type air flow meter, a Karman vortex sensor system, or a heat wire system may be used.

What is claimed is:

1. An engine control system, comprising:
a variable nozzle turbocharger for adjusting a flow rate of an exhaust gas flowing in an exhaust gas discharge passage by changing an opening degree of a variable nozzle provided in the exhaust gas discharge passage and for blowing the exhaust gas of an engine into a turbine;
an exhaust gas recirculation device for adjusting a recirculation volume of the exhaust gas flowing in an exhaust gas recirculation passage by changing an opening degree of a flow rate control valve provided in the exhaust gas recirculation passage and for recirculating a part of the exhaust gas of the engine to an intake side;
an intake air pressure detection unit for detecting a pressure of intake air of the engine;
an intake air volume detection unit for detecting a flow rate of the intake air of the engine; and
an engine control unit which obtains a first control command value by using a first feedback amount updated according to a deviation between an actual intake pressure detected by the intake air pressure detection unit and a target intake pressure and feedback controls the opening degree of the variable nozzle according to the obtained first control command value, and which obtains a second control command value by using a second feedback amount updated according to a deviation between an actual intake volume detected by the intake air volume detection unit and a target intake volume, and feedback controls the opening degree of the flow rate control valve according to the obtained second control command value,
wherein when an index value indicating a specified hunting state of one of the first control command value and the second control command value exceeds a predetermined value, the engine control unit obtains one of the first control command value and the second control command value by multiplying one of the first feedback amount and the second feedback amount by a correction coefficient to decrease an absolute value of the feedback amount.

2. An engine control system according to claim 1, wherein the correction coefficient is changed according to a magnitude of the index value indicating the specified hunting state.

3. An engine control system according to claim 1, wherein when the index value indicating a convergence state of hunting of one of the first control command value and the second control command value is turned to the predetermined value or less, the engine control unit removes the correction coefficient multiplied to the one of the first feedback amount and the second feedback amount and obtains the one of the first control command value and the second control command value.

4. An engine control system according to claim 1, wherein when the index value indicating a convergence state of hunting of one of the first control command value and the second control command value is turned to the predetermined value or less, the engine control unit multiplies one of the first feedback amount and the second feedback amount by a correction coefficient to increase an absolute value of the feedback amount, and obtains the one of the first control command value and the second control command value.

5. An engine control system according to claim 1, wherein the index value is a frequency of one of the first control command value and the second control command value.

6. An engine control system according to claim 1, wherein the index value is an amplitude width value or an oscillation frequency per unit time of one of the first feedback amount and the second feedback amount.

7. An engine control system according to claim 1, wherein the index value is an integrated amount per unit time obtained by integrating an oscillation amount of one of the first control command value and the second control command value.

8. An engine control system according to claim 1, wherein the index value is an integrated amount per unit time obtained by integrating an oscillation amount of one of the first feedback amount and the second feedback amount.

* * * * *